March 20, 1951 J. LEVY 2,545,477

TWO-WAY LOUD-SPEAKER INTERCOMMUNICATION SYSTEM

Filed May 21, 1948 2 Sheets-Sheet 1

Jacques Levy
By Christy, Parmelee & Strickland
his attorneys

March 20, 1951 J. LEVY 2,545,477

TWO-WAY LOUD-SPEAKER INTERCOMMUNICATION SYSTEM

Filed May 21, 1948 2 Sheets-Sheet 2

Jacques Levy
by Christy, Parmelee & Strickland
his attorneys

Patented Mar. 20, 1951 2,545,477

UNITED STATES PATENT OFFICE 2,545,477

TWO-WAY LOUD-SPEAKER INTERCOMMUNICATION SYSTEM

Jacques Levy, Paris, France, now by change of name, Jacques Lory

Application May 21, 1948, Serial No. 28,446
In France May 29, 1947

8 Claims. (Cl. 179—1)

The invention relates to improvements in telephone installations wherein each station comprises a fixed microphone and a loud speaker and wherein each of two persons in conversation can hear the other through the loud speaker without it being necessary to speak in close proximity to the microphone. This result is obtained owing to an amplifier arrangement inserted in each of the lines connecting the microphone of one station with the loud speaker of the other.

In a simple installation comprising an outgoing line and a return line without electrical or electromechanical-connection between them this amplification of the audition is limited by the starting of oscillations of audible frequency due to the acoustic coupling of the two lines at their extremities, the sounds emitted by the loud speaker of a station being impressed upon the microphone of that station.

These oscillations maintained and transformed into whistling noises detract from clear audition and are known as the Larsen effect. If it is desired to avoid the intensity of amplification at which these noises are produced, the amplification is altogther insufficient for a speaker to be understood from the other station without elevating his voice or without approaching the microphone.

The invention has for its object an arrangement which avoids this drawback and whereby one of the lines is blocked when the other is used for conversation.

According to the invention, the installation comprises in combination means for limiting during idle periods the field of excitation of the microphone and loud speaker of each station (or one of these two units only) to such an intensity that no start of whistling (Larsen effect) is produced, and means for causing the field of excitation to disappear completely from the said unit or units of the line not used and to increase at the same time this field for the said unit or units of the line utilized when a person speaks before one of the microphones.

In one practical example one or more windings, coils or other devices producing the said field of a line are traversed, for example in series, by the anodic current of an electronic valve the control grid of which is polarized by a tension developed upon a resistance traversed by the rectifier anodic current of the electronic valve corresponding with the other line and by a tension developed upon a resistance traversed by the current, rectified, coming from the amplifier of the other line. In this manner, when the amplifier discharges a current relatively intense (conversations) the electronic valve of the line not used is blocked. From this results, on the one hand, the disappearance of the excitation current of the units of the line not used and, on the other hand, the disappearance of the over polarization of the electronic valve of the line in use, that is to say the reinforcement of the excitation of the units of that line.

Figure 1:
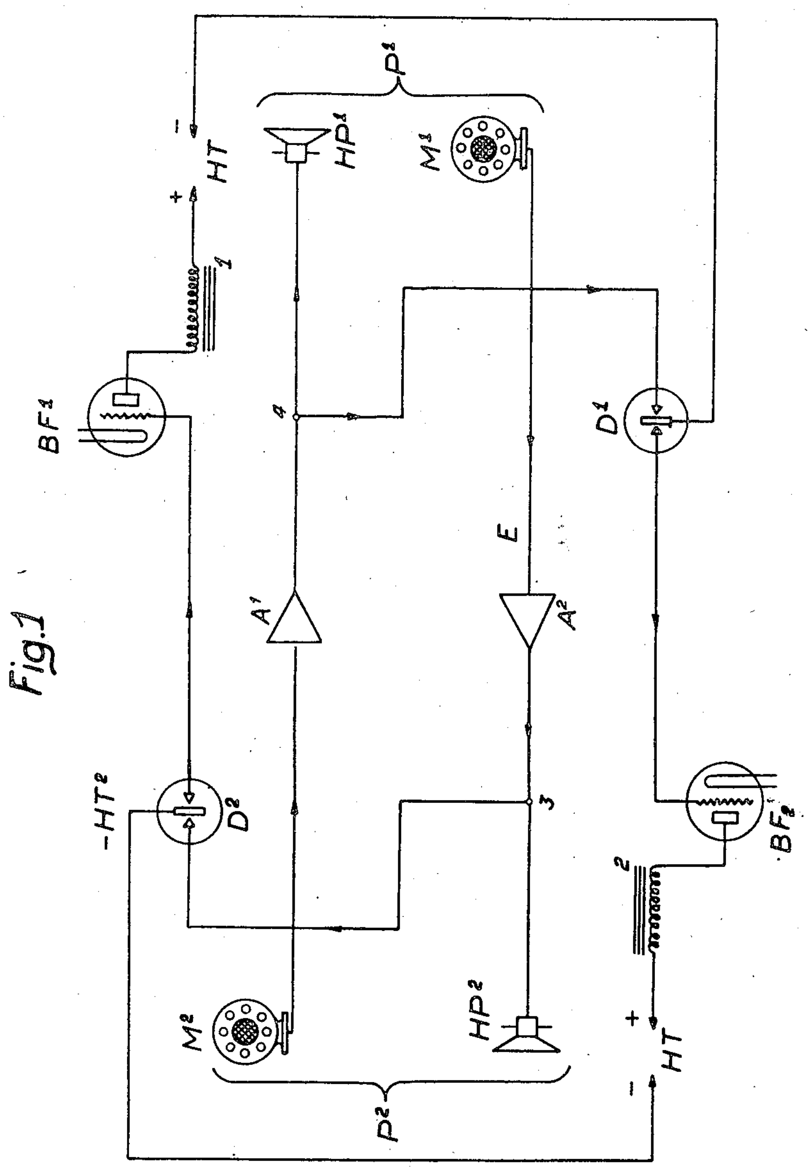
Figure 1 is a diagram of an installation in accordance with the invention.

In the drawing, and referring to Figure 1, an amplifier A2 is inserted between the microphone M1 of the station P1 and the loud speaker HP2 of the station P2. Similarly between M2 and HP1 there is an amplifier A1.

The excitation of the loud speaker HP1 is produced by an electromagnet or a coil indicated diagrammatically at 1 and traversed by the anodic current of an electronic valve BF1 the grid of which is connected between the amplifier A2 and the loudspeaker HP2, at a point 3, through the intermediary of a rectifier D2. Similarly, the excitation of HP2 is produced by the anodic current of an electronic valve BF2 the grid of which is connected at the point 4 between, A1 and HP1, through the intermediary of a rectifier D1.

The rectifier D2 receives the anodic current of BF2 after its passage through the winding 2. Similarly, the rectifier D1 receives the current from BF1 after its passage through the winding 1.

The apparatus functions thus—When neither station is speaking, the excitation of 1 and 2 is too feeble for the production of a whistle characteristic of the Larsen effect, in particular by reason of the polarization of the grids of BF1 and BF2 as hereinafter mentioned.

If one of the stations, for example P1, speaks, the modulation of M1, amplified by A2 and rectified by D2, polarizes the grid of BF1 and so practically suppresses the anodic current emitted by this valve and, consequently, the excitation of 1. The loud speaker HP1 is put out of action and thus all risk of Larsen effect is avoided.

The relatively feeble current coming from BF1 and acting upon D1 gives, during an idle period of this installation, a tension sufficient for bringing the polarization of the grid of BF2 into a region such that this valve amplifies little and this avoids all whistling during the idle period.

The disappearance of the current from BF1 diminishes the polarization of the grid of BF2, and this increases the intensity of the current which comes from the valve and therefore also the field of the coil 2. The loud speaker is thus rendered more sensitive.

It will be seen that when speaking before M1, the sensitiveness of HP1 is caused to disappear and that of HP2 is augmented. Similarly, when speaking at the station P2, there is obtained by analogous action a blockage of HP2 and an increased sensitiveness of HP1.

An arrangement in accordance with the invention permits therefore, without risk of Larsen effect, either during idle periods or during use, very powerful amplifications during use.

The time constants of the circuits are calculated to permit the assemblage to resume the initial state between two words or two syllables, which permits the speakers to interrupt.

A modification of the above described installation consists in applying to the excitation of the microphones the arrangement described for the excitation of the loud speakers and this adds to the security against risk of whistling during idle periods and diminishes during such periods the sensitivity of the microphones.

If dynamic microphones are used, their excitation is assured in parallel with the excitation of the loud speakers, the necessary filtrage being provided for.

If carbon microphones are used, their excitation could be assured directly by the plate current from the valves BF1 and BF2.

If electrostatic microphones are used, their excitation is assured by the tension at the terminals of a resistance inserted in the anode of a valve of variable gradient.

Figure 2:
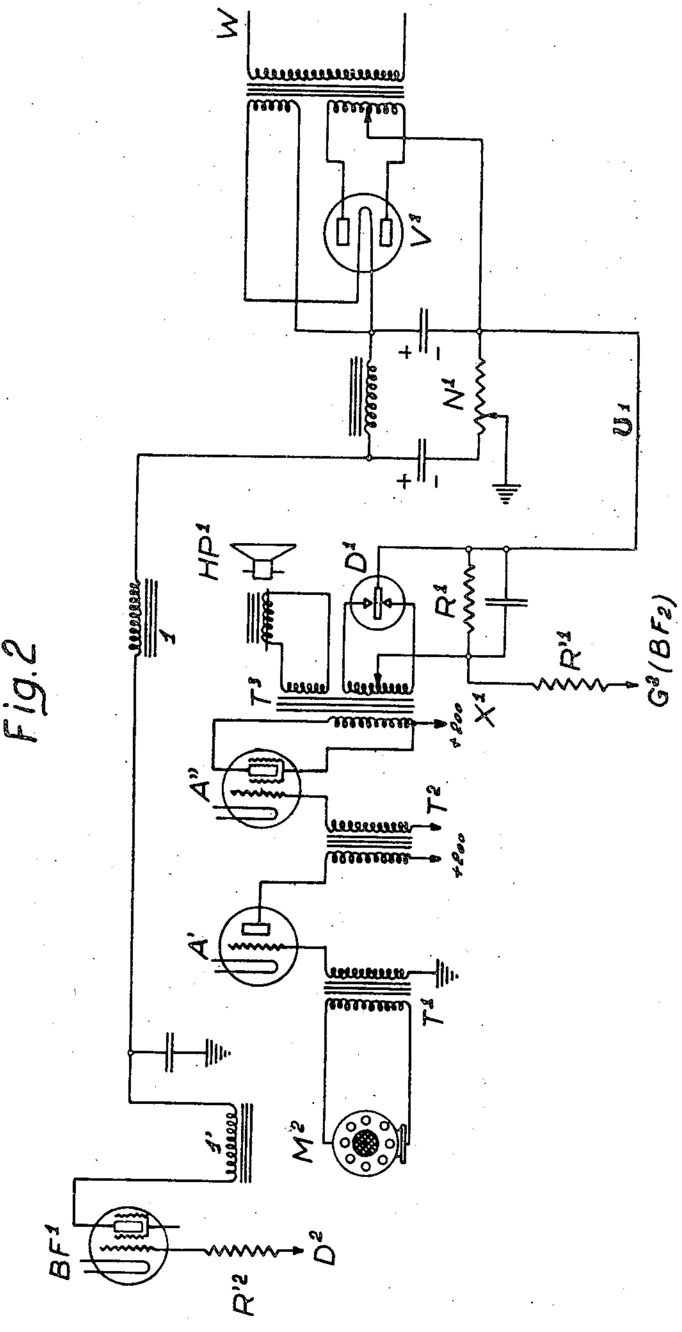
Figure 2 is a diagram showing the arrangement of parts and connections.

In Figure 2 the scheme of connections of a line is illustrated, assuming that the arrangement according to the invention is applied both to the microphone and the loud speaker.

The microphone M2 connected with the transformer T1, the valves A′ and A″ constitute in assemblage the amplifier A1 of Figure 1. From this, the current is transmitted by the transformer T3, corresponding with the point of derivation 4 in Figure 1, on the one hand to the loud speaker HP1 excited by the coil 1 and on the other hand to the rectifier D1 shunted by the resistance R1, the latter having its terminals connected to the grid G2 of BF2. In the anode circuit of BF1 are included the excitation coil 1′ of M2 and the coil 1 of HP1. The polarization of the grid G2 of BF2 is impressed upon the potentiometer N1 by the conductor U1, the resistance R1, the conductor X1 and the resistance R″. The tension raised in N1 varies, all things being equal, as a function of the anodic current of BF1 which passes through the coil 1′, the coil 1, and the valve V1 to arrive at N1. The potentiometer N1 is adjusted in such manner that the anodic current of BF2 gives upon the microphone and the loud speaker of the second line (not shown) an excitation sufficiently feeble for it to be unable to start a whistling when the installation is not in use.

The installation is fed by the sector W through the intermediary of the valve V1.

When there is speech at M2, the current of modulation received by T3 and rectified by D1 causes the appearance at the exit of R1 of a negative tension which strongly polarizes BF2. The result is the disappearance of the anodic current of BF2 and consequently:

The suppression of the field of the coils of the second line corresponding to 1 and to 1′:

The suppression of the over polarization of BF1 by the potentiometer corresponding to N1 in the second line and the consecutive reinforcement of the field of the coils 1 and 1′.

What I claim is:

1. In a transmission system, a pair of transmission units respectively having a microphone and a loud speaker by which sound may be transmitted between a pair of stations, there being a loud speaker and a microphone at each of said stations, a pair of control devices, means whereby said control devices are respectively operable for controlling the transmission of sound by each of said units, each of said devices having an energizing circuit including means whereby it is normally operable to maintain its energization at a value insufficient to effect an acoustic coupling between said units, and means responsive to the transmission of sound over one of said units for actuating said control devices to inversely vary the operation of said energizing circuits whereby the energization of the control device in the unit transmitting is increased and the energization of the control device in the other unit is decreased.

2. In a transmission system, a pair of transmission units respectively having a microphone and a loud speaker by which sound may be transmitted between a pair of stations, there being a loud speaker and a microphone at each of said stations, a pair of control devices, means whereby said control devices are respectively operable for regulating the gain of each of said units to control the transmission of sound thereby, each of said devices having an energizing circuit including means whereby it is normally operable to maintain the gain of the unit controlled thereby at a value below that effective to acoustically couple said units, and means operable through said energizing circuits to inversely vary the energization of said control devices whereby the gain of one of said units is increased and the gain of the other of said units is decreased in response to the transmission of sound over said one unit.

3. In a transmission system, a pair of transmission units respectively having a microphone and a loud speaker by which sound may be transmitted between a pair of stations, there being a loud speaker and a microphone at each of said stations, a pair of control devices, means whereby said control devices are respectively operable for regulating the gain of each of said units to control the transmission of sound thereby, each of said devices being provided with means including an electronic valve having an anode circuit connected thereto, a control grid, and an energizing circuit including means normally operable for biasing its grid to a value effective through the control device connected to its anode circuit to limit the gain of the unit controlled by such device to a value ineffective to acoustically couple said units, and means operative in response to the transmission of sound by one of said units for inversely varying the biases on said grids whereby the gain of said one unit is increased and the gain of the other of said units is decreased.

4. In a transmission system, a pair of transmission units respectively having a microphone and a loud speaker by which sound may be transmitted between a pair of stations, there being a loud speaker and a microphone at each of said stations, a pair of control devices, means whereby said control devices are respectively operable for regulating the gain of each of said units to control the transmission of sound thereby, each of said devices being provided with means including an electronic valve having an anode circuit connected thereto, a control grid, and means including a rectifier connecting its grid with the other of said control devices, and means coupling each of said rectifiers with a different one of said units for varying the gain of said units inversely in response to the transmission of sound by said units whereby the gain of the unit transmitting sound is increased and the gain of the other unit is decreased.

5. A system as claimed in claim 4, wherein said control devices comprise respectively coils providing field excitation for the loud speakers of said units.

6. A loud speaker telephone installation comprising in combination two stations each including microphone and loud speaker apparatus, a pair of transmission lines connecting said stations with each other, an amplifier in each of said lines, an excitation control device at each of said stations including means for controlling the transmission of sound by one of said lines, the control device for each of said lines comprising an electronic valve having a control grid, and means including a rectifier connecting the control grid of the valve in each of said lines to another of said lines at a point between the amplifier and loud speaker apparatus therein, and means normally operative through said valves for maintaining the excitation of said control devices at a value insufficient to effect an acoustic coupling between said lines, and for varying the excitation of said control devices inversely in response to the transmission of sound by one of said lines to increase the gain of said one line with a corresponding decrease in the gain of the other of said lines to prevent the transmission of sound by the other line.

7. A loud speaker telephone installation comprising in combination two stations each including microphone and loud speaker apparatus, a pair of transmission lines respectively connecting said stations with each other, an amplifier in each of said lines, an excitation control device at each station including means for controlling the transmission of sound by one of said lines, each of said control devices in one of said lines being provided with an electric control valve having an anode circuit connected to such control device, a control grid, and means including a rectifier connecting said control grid to the other of the lines at a point between the amplifier and loud speaker therein, each rectifier further having a connection with the anode circuit of the other electronic valve through the exciter control device for the loud speaker in said one line, said rectifiers and their respective connections comprising a control means for preventing an acoustic coupling between said lines and for varying the excitation of said control devices inversely to prevent operation of one of said lines when the other of said lines is operating.

8 A loud speaker telephone installation comprising in combination two stations each including microphone and loud speaker apparatus, transmission lines respectively connecting said stations with each other, an amplifier connected in each of the said lines, each of said stations having an excitation control device including means controlling the operation of said apparatus and energizing circuit means therefor comprising an electronic valve having its anode circuit connected thereto, a control grid, and means including a rectifier for connecting the control grid of the control device in one of said lines to another of said lines at a point between the amplifier and loud speaker in said other line, the rectifier connected to the grid of each of valves further having means providing a connection with the anode circuit of an other of said valves through the control device connected to such anode circuit whereby the energization of said control device is normally maintained at a value effective to limit the gain of said lines to prevent an acoustic coupling therebetween, and the energization of one of said control devices is increased to increase the gain of the line in which it is located in response to the transmission of sound over such line with a decrease in the energization of the other of said control devices.

JACQUES LEVY.

REFERENCES CITED

The following references are of record in the file of this patent:

UNITED STATES PATENTS

| Number | Name | Date |
|---|---|---|
| 2,129,990 | DeFremery | Sept. 13, 1938 |
| 2,199,220 | French | Apr. 30, 1940 |
| 2,205,142 | Hoard | June 18, 1940 |
| 2,341,539 | Giannini | Feb. 15, 1944 |
| 2,366,011 | Donaldson | Dec. 26, 1944 |
| 2,369,351 | Herrick | Feb. 13, 1945 |
| 2,424,069 | Tschumi | July 15, 1947 |